(No Model.)
J. BAKER.
WASHING MACHINE.
No. 286,109. Patented Oct. 2, 1883.
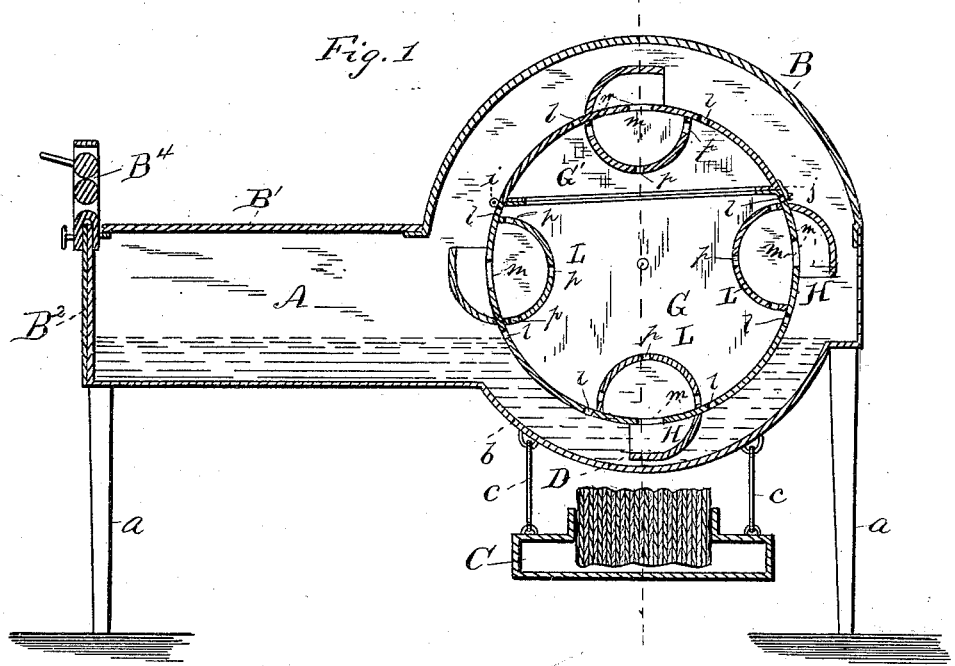
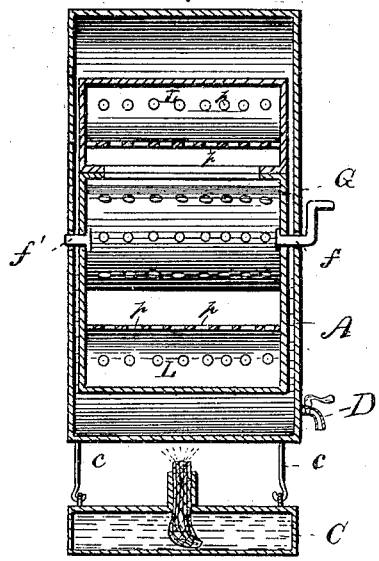
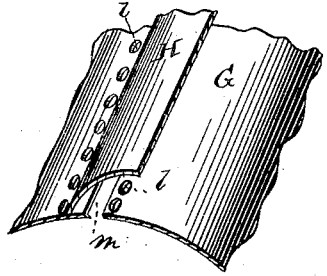
WITNESSES
W. E. Bowen.
Geo. H. Harvey
INVENTOR
James Baker
T. H. Alexander
Attorney

UNITED STATES PATENT OFFICE.

JAMES BAKER, OF ST. LOUIS, MISSOURI.

WASHING-MACHINE.

SPECIFICATION forming part of Letters Patent No. 286,109, dated October 2, 1883.

Application filed July 28, 1883. (No model.)

*To all whom it may concern:*

Be it known that I, JAMES BAKER, of St. Louis, in the State of Missouri, have invented certain new and useful Improvements in Washing-Machines; and I do hereby declare that the following is a full, clear, and exact description thereof, reference being had to the accompanying drawings, and to the letters of reference marked thereon, which form part of this specification, in which—

Figure 1 is a vertical section through my improved rotary washing-machine, taken in a longitudinal plane. Fig. 2 is a vertical section, taken transversely through the machine, as indicated by the dotted line $x\ x$ on Fig. 1. Fig. 3 is a perspective detail of the machine, showing one of the buckets and a section of the cylinder as I prefer to perforate and slot it.

The object of my invention is to improve rotary washing-machines; and it consists in a certain peculiar construction, which will be fully understood from the following description when taken in connection with the annexed drawings and claim.

A designates a pan or vessel, which is mounted on legs $a\ a$. This pan has a depression or channel, $b$, and it is covered by a cap, B, and a plate, B'. It is also provided with a re-enforcement, B², at one end, for the purpose of strengthening that portion, to which I shall apply a wringer, B⁴, of the well-known kind.

Beneath the depressed portion of my pan or tub I hang, by means of hooks $c\ c$, a heating-vessel, C, which is detachable. This heating-vessel may be a coal-oil stove; or it may be constructed in any manner which is found best adapted to the purpose of warming the water in the pan or vessel A. It will be observed that the depressed portion of the pan has an outlet, D, provided with a cock, for allowing the sediment to be drawn off at pleasure.

Each side of the pan or vessel above described affords a bearing for a rotary washing device, which I will now explain.

The short trunnions $f\ f'$ are sustained in suitable bearings in the cheeks of the vessel A, and the trunnion $f$ has a crank-handle on it, for the purpose of turning the cylinder G. This cylinder G is provided with a section, G', which I prefer to hinge at $i$, and to provide with a suitable fastening, $j$.

On the outside of the cylinder G, and arranged at suitable distances, I secure buckets H. These buckets are designed for dipping up the water from the said depressed portion of the pan and emptying the same into the interior of the cylinder G.

It will be observed that the cylinder G is perforated at $l\ l$ and slotted or perforated at $m$, and that the hoods or buckets H extend above the central perforations or slots, $m$. My object is to dip up water and empty it through the perforations or slots $m$ upon the articles to be washed.

Inside of the cylinder, and rigidly secured thereto, are semi-cylindrical portions L, which are perforated, and which operate as dashers or beaters. These interior portions, L, have perforations $p\ p\ p$ through them, through which the water is caused to fall on the articles in the cylinder G. I also provide on opposite sides of the interior sprinklers, L, perforations through the wall of the cylinder G, which will allow the filthy water to readily escape and fall into the channel $b$ of the pan or vessel A, from which the precipitate can be withdrawn through the cock at pleasure.

The rotary cylinder, with its interior semi-cylindrical dashers, is constructed with a hinged segment or gate, by opening which articles can be introduced or removed. This gate is hinged transversely with respect to the axis of the cylinder for the purpose of allowing the cleansed articles to be deposited into the water in the shallow raised portion of the vessel A, from which they can be conveniently manipulated for the purpose of wringing them.

By my invention I prevent the clothes from adhering to the cylinder G, for the reason that I use buckets on the outside of this cylinder, which will pick up large quantities of water and discharge it into this cylinder against the clothes, the effect of which is that they are rapidly cleansed. I prefer to use slots, instead of perforations, through the wall of cylinder G, although I may use either.

The operation of my machine may be briefly described as follows: A suitable number of articles to be cleansed is put into the cylinder G, and the tub or vessel A is supplied with water and soap. The lamp N, which is beneath the depressed portion of the said vessel, is lighted, and when the water is at a desired temperature the cylinder G is rotated. The buckets on this cylinder will pick up the water and discharge it through the perforations which are through the internal perforated semi-cylindrical dashers. When the articles are cleansed the gate of the cylinder is opened, and they are deposited into the shallow portion of the vessel A by reversing the motion of the cylinder, from which they can be conveniently taken and passed between the rollers of the wringer.

I am well aware that it is not new to employ in connection with a revolving cylinder for washing purposes perforated tubes on the inner side of said cylinder, or buckets arranged on the outer side thereof, and therefore lay no claim, broadly, to these features.

Having thus fully described my invention, what I claim as new, and desire to secure by Letters Patent, is—

The combination, in a washing-machine, of a rotary cylinder having a series of troughs on its periphery extending from end to end of said cylinder, a series of perforated dashers of like length on the inner side thereof opposite to the troughs and communicating therewith by a slot or a series of perforations and apertures on both sides of the troughs, with a suitable pan or water-holder, all constructed and adapted to operate substantially as and for purposes set forth.

In testimony that I claim the foregoing as my own I affix my signature in presence of two witnesses.

JAS. BAKER.

Witnesses:
T. H. ALEXANDER,
F. O. McCLEARY.